United States Patent
Matsunaga et al.

(10) Patent No.: US 11,462,850 B2
(45) Date of Patent: Oct. 4, 2022

(54) OIL TEMPERATURE SENSOR

(71) Applicant: Yazaki Corporation, Tokyo (JP)

(72) Inventors: Kazuyuki Matsunaga, Shizuoka (JP); Keisuke Yamauchi, Shizuoka (JP); Toshirou Mochizuki, Shizuoka (JP); Shingo Nomoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 732 days.

(21) Appl. No.: 16/441,132

(22) Filed: Jun. 14, 2019

(65) Prior Publication Data

US 2019/0386419 A1    Dec. 19, 2019

(30) Foreign Application Priority Data

Jun. 18, 2018   (JP) .............................. JP2018-115116

(51) Int. Cl.
| | |
|---|---|
| *H01R 13/405* | (2006.01) |
| *H01R 13/66* | (2006.01) |
| *G01K 7/22* | (2006.01) |
| *H01R 4/18* | (2006.01) |
| *G01K 1/08* | (2021.01) |
| *H01R 13/424* | (2006.01) |

(52) U.S. Cl.
CPC ............ *H01R 13/405* (2013.01); *G01K 1/08* (2013.01); *G01K 7/22* (2013.01); *H01R 4/185* (2013.01); *H01R 13/424* (2013.01); *H01R 13/6683* (2013.01)

(58) Field of Classification Search
CPC ............... H01R 13/405; H01R 13/424; H01R 13/6683; H01R 4/185; G01K 7/08; G01K 7/22
USPC ......................................... 374/185
See application file for complete search history.

(56) References Cited

U.S. PATENT DOCUMENTS

| | | | |
|---|---|---|---|
| 2016/0305825 A1* | 10/2016 | Chokri ................... | G01K 1/12 |
| 2019/0386437 A1* | 12/2019 | Matsunaga ............ | G01K 7/22 |

FOREIGN PATENT DOCUMENTS

| | | | | |
|---|---|---|---|---|
| DE | 20008664 U1 * | 8/2000 | ............. | G01K 7/16 |
| EP | 1154250 A1 * | 11/2001 | ............. | G01K 7/16 |
| FR | 2660431 A1 * | 10/1991 | ............. | G01K 7/22 |
| JP | 05-036330 U | 5/1993 | | |
| KR | 20150026254 A * | 3/2015 | ............. | G01K 1/08 |

* cited by examiner

*Primary Examiner* — Peter G Leigh
(74) *Attorney, Agent, or Firm* — Sughrue Mion, PLLC (57) ABSTRACT

An oil temperature sensor includes a housing assembly in which a lead frame on which a thermistor for detecting a temperature of oil is mounted is integrated with a housing such that a tip-side terminal portion is exposed outward. The housing includes a groove formed linearly into which a cable-attached terminal is inserted. The groove is opened on both sides of the groove in the extending direction and is also opened in one direction crossing the extending direction. A joint terminal portion and a sheath of a cable are partially inserted into the groove.

7 Claims, 12 Drawing Sheets

OIL TEMPERATURE SENSOR

CROSS REFERENCE TO RELATED APPLICATION

This application is based upon and claims the benefit of priority from the prior Japanese Patent Application No. 2018-115116, filed on Jun. 18, 2018, the entire contents of which are incorporated herein by reference.

BACKGROUND

1. Technical Field

The present invention relates to an oil temperature sensor.

2. Related Art

An oil temperature sensor including a housing assembly formed by integrating a terminal to which a thermistor is connected with a housing has been known. This kind of oil temperature sensor has been proposed in JP H05-036330 Y. In JP H05-036330 Y, a conductor of a cable is electrically connected by soldering to a terminal exposed from the housing. Then, a groove having a bent portion is formed on a surface of the housing, and the cable to be soldered to the terminal is fitted in the groove. With this structure, if an external force such as a tensile force is applied to the cable, the force is received by the bent portion and is prevented from being applied to the soldered portion.

SUMMARY

In the related art technique, however, inserting the cable into the groove has not been easy, because the cable is fitted in the groove having the bent portion. In soldering the cable to the terminal, the conductor portion exposed from the sheath of the cable is inserted into the hole formed in the terminal. Thus, it takes time and effort to connect the cable to the terminal.

As described above, the related art technique cannot hold the cable in the housing and connect the cable to the terminal portion in an efficient manner.

It is an object of the present invention to provide an oil temperature sensor capable of holding a cable in a housing and connecting the cable to a terminal portion more efficiently.

According to an embodiment, there is provided an oil temperature sensor, including: a housing assembly in which a lead frame on which a thermistor for detecting a temperature of oil is mounted is integrated with a housing in a manner that a tip-side terminal portion is exposed outward, wherein the housing includes a groove formed linearly and into which a cable-attached terminal is inserted, the cable-attached terminal including a cable and a joint terminal portion, the joint terminal portion being connected electrically to a conductor exposed from a sheath of the cable and being connected electrically to the terminal portion, the groove is formed to be opened on both sides in an extending direction of the groove and opened in one direction crossing the extending direction, the joint terminal portion and the sheath of the cable are partially inserted into the groove, and the joint terminal portion includes a cable connecting portion, a portion to be inserted, and a connecting terminal portion, the cable connecting portion being connected to the cable and inserted into the groove, the portion to be inserted being provided continuously from the cable connecting portion and inserted into the groove, and the connecting terminal portion being provided continuously from the portion to be inserted, exposed outward from the housing, and connected electrically to the terminal portion.

The groove may include a press-fit rib formed protruding inside the groove at a portion of the groove into which the sheath is inserted.

The groove may include a positioning recess recessed in a direction crossing the extending direction of the groove, and the portion to be inserted includes a positioning projection arranged in the positioning recess with the cable-attached terminal being inserted into the groove.

The positioning projection may be provided with a rising piece rising up toward the opening in the one direction.

The connecting terminal portion may include, on the housing side, a position restricting portion that abuts on the housing to restrict movement of the cable-attached terminal in the extending direction of the groove with the cable-attached terminal being inserted into the groove.

The position restricting portion may be provided with a rising piece rising up toward the opening in the one direction.

With the cable-attached terminal being inserted into the groove, the terminal portion and the connecting terminal portion may be in contact with each other, and the terminal portion and the connecting terminal portion may be mechanically connected.

At least one terminal portion of the terminal portion and the connecting terminal portion may be bent at a portion away from the housing toward the other terminal portion.

According to the present embodiment, it is possible to provide an oil temperature sensor capable of holding the cable in the housing and connecting the cable to the terminal portion more efficiently.

DETAILED DESCRIPTION

Embodiments of the present invention will be described in detail below with reference to the accompanying drawings. In the following, an oil temperature sensor which detects the temperature of oil used in a motor vehicle, such as an automatic transmission fluid (ATF) flowing through an automatic transmission, is described as an example. To detect the temperature of the ATF, the temperature of the ATF detected by the oil temperature sensor is output to an electronic control unit (ECU). The detected temperature of the ATF is used for transmission control of the ECU. Specifically, the ECU controls shock reduction of gearshift, optimal gear selection corresponding to traveling conditions, fuel efficiency improvement, and so on in accordance with the detected temperature of the ATF.

Similar components are included in a plurality of embodiments described below. The same reference numerals are given to such similar components and their descriptions are not repeated.

First Embodiment

An oil temperature sensor 1 according to the present embodiment includes a sensor body 10 that detects the temperature of oil.

Figure 1A:
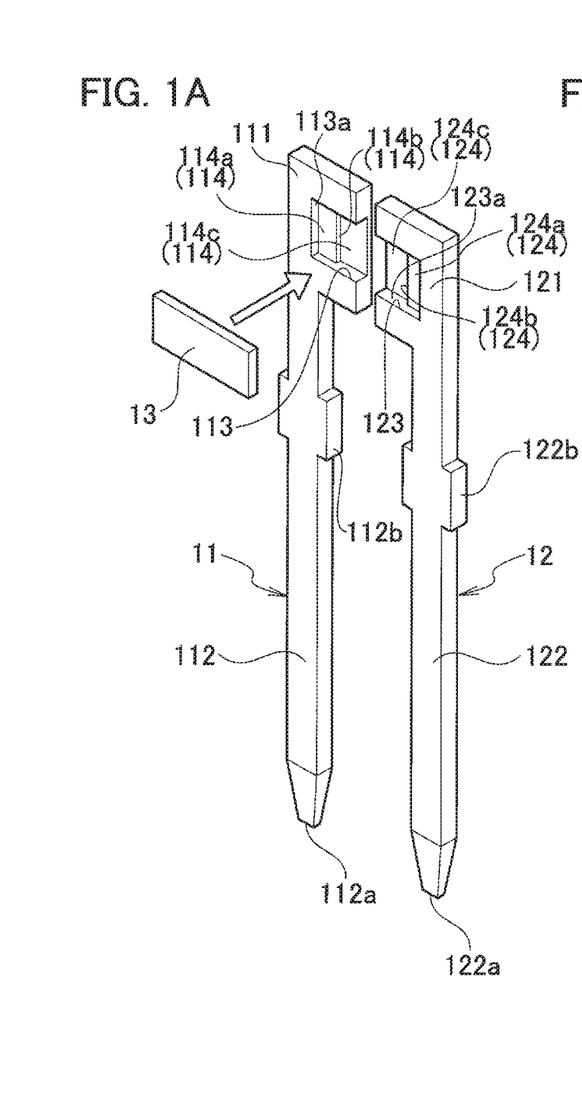
FIG. 1A is a perspective view schematically illustrating an example structure of a sensor body according to a first embodiment before a thermistor is mounted on a lead frame.
Figure 1B:
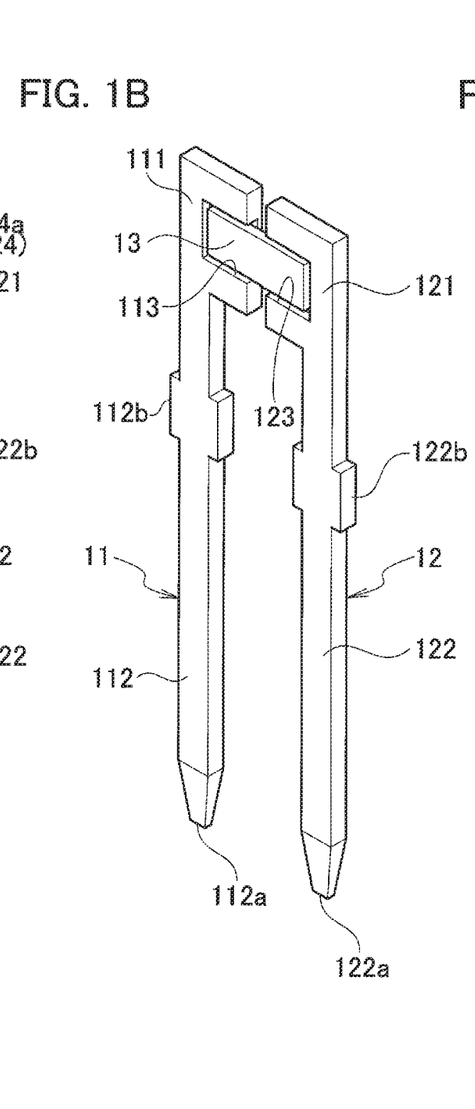
FIG. 1B is a perspective view schematically illustrating an example structure of the sensor body according to the first embodiment when the thermistor is mounted on the lead frame.
Figure 1C:
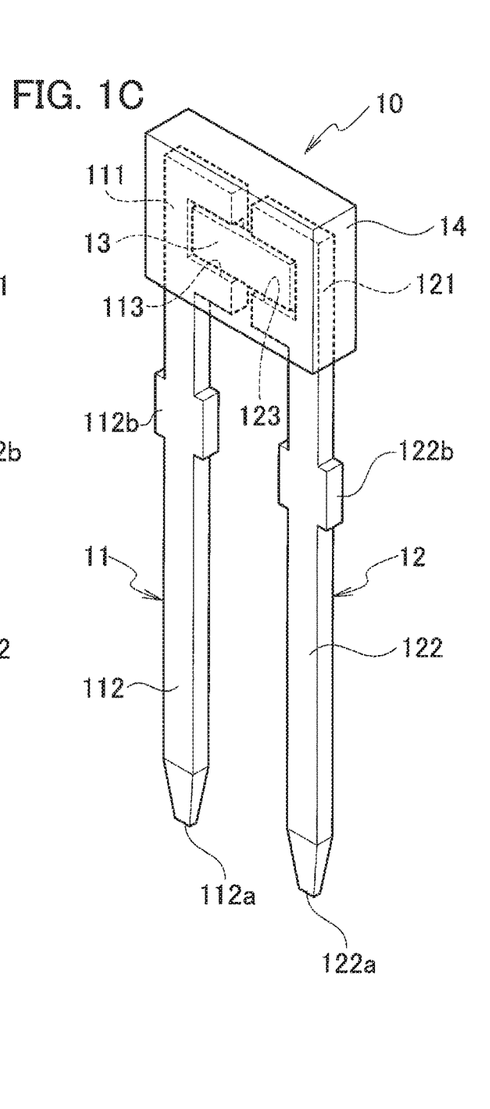
FIG. 1C is a perspective view schematically illustrating an example structure of the sensor body according to the first embodiment in which the sensor body is illustrated.

As illustrated in FIGS. 1A to 1C, the sensor body 10 includes a first lead frame 11 and a second lead frame 12 which is arranged apart from the first lead frame 11. The first lead frame 11 and the second lead frame 12 are conductive, and may be formed using, for example, a metal plate.

The first lead frame 11 and the second lead frame 12 are electrically connected via a thermistor 13 that outputs a signal corresponding to the temperature of the oil. Specifically, one end of the thermistor 13 is mounted on the first lead frame 11, while the other end of the thermistor 13 is mounted on the second lead frame 12, thus electrically connecting the first lead frame 11 and the second lead frame 12 via the thermistor 13.

The sensor body 10 also includes a resin mold portion 14. The resin mold portion 14 covers the thermistor 13 and the portion where the first lead frame 11 and the second lead frame 12 are mounted on the thermistor 13 (see FIG. 1C). In the present embodiment, a first recess 113 described later is a mounting portion of the first lead frame 11 on the thermistor 13, and a second recess 123 is a mounting portion of the second lead frame 12 on the thermistor 13.

In the present embodiment, the thermistor 13 is entirely covered with the resin mold portion 14, as illustrated in FIG. 1C. On the other hand, the first lead frame 11 and the second lead frame 12 are covered with the resin mold portion 14 only partially (near the portion where the thermistor 13 is mounted).

As described above, in the present embodiment, the first lead frame 11 has a first buried portion 111 on which one end of the thermistor 13 is mounted and which is buried in the resin mold portion 14. Further, the first lead frame 11 includes a first terminal portion 112 which is provided continuously from the first buried portion 111 and exposed from the resin mold portion 14. The first lead frame 11 is formed in an elongated shape.

Similarly, the second lead frame 12 includes a second buried portion 121 on which the other end of the thermistor 13 is mounted and which is buried in the resin mold portion 14. Further, the second lead frame 12 includes a second terminal portion 122 which is provided continuously from the second buried portion 121 and exposed from the resin mold portion 14. The second lead frame 12 is formed in an elongated shape.

In the present embodiment, the first lead frame 11 and the second lead frame 12 are formed to be substantially symmetrical in plan view.

The first lead frame 11 and the second lead frame 12 are arranged substantially in parallel so that the first lead frame 11 and the second lead frame 12 are arranged longitudinally in the same direction. The first lead frame 11 and the second lead frame 12 are arranged widthwise in such a manner that the first buried portion 111 and the second buried portion 121 face each other and the first terminal portion 112 and the second terminal portion 122 face each other.

The first lead frame 11 and the second lead frame 12 are formed such that their end portions are wider on the side of the buried portions than on the side of the terminal portions. Specifically, in the plan view, the end portions on the side of the buried portions of the first lead frame 11 and the second lead frame 12 are formed in a protruding shape toward the end portions of the opponent buried portions. In other words, a facing distance between the first lead frame 11 and the second lead frame 12 is shorter at the end portions on the side of the buried portions than at the end portions on the side of the terminal portions.

The thermistor 13 is mounted on the end portions on the side of the buried portions where the facing distance is short. As described above, by decreasing the facing distance only at the portion where the thermistor 13 is mounted, while ensuring the insulation distance between the terminal portions, mounting of the thermistor 13 is facilitated. Preferably, the facing distance at the portion where the thermistor 13 is mounted is set so as to prevent short-circuiting between the two lead frames due to melted solder during mounting, while preventing insufficient mounting due to outflow of the solder.

Further, a recess is formed in both the first and second buried portions 111 and 121, and the thermistor 13 is placed in the recess in the present embodiment.

Specifically, the first buried portion 111 includes a first recess 113 which is opened toward the second buried portion 121 and in which one end of the thermistor 13 is mounted. The second buried portion 121 includes a second recess 123 located at a portion facing the first recess 113. The second recess 123 is opened toward the first buried portion 111 and in which the other end of the thermistor 13 is mounted.

By mounting the thermistor 13 in the recess configured as described above, the solder flow can be stopped by inner surfaces 113a and 123a of each recess when the thermistor 13 is soldered. The inner surfaces 113a and 123a also prevent positional displacement of the thermistor 13.

In the present embodiment, the first recess 113 is formed stepwise so that its depth becomes deeper toward the second recess 123. The second recess 123 is formed stepwise so that its depth becomes deeper toward the first recess 113.

Specifically, the first recess 113 includes a near-side mounting surface 114a located away from the second recess 123 and near the opening of the first recess 113 (open side in the thickness direction), and having a shallow depth from the opening. The near-side mounting surface 114a is formed to extend longitudinally and widthwise. The first recess 113 also includes a far-side mounting surface 114c located closer to the second recess 123 and on the far side of the first recess 113, and having a deep depth. The far-side mounting surface 114c is formed to extend longitudinally and widthwise. Further, the first recess 113 includes a stepped surface 114b connecting the near-side mounting surface 114a and the far-side mounting surface 114c. The stepped surface 114b is formed to extend in the thickness direction of the first lead frame 11. Thus, the first recess 113 includes a stepped portion 114 formed by the near-side mounting surface 114a, the far-side mounting surface 114c, and the stepped surface 114b.

Similarly, the second recess 123 includes a near-side mounting surface 124a located away from the first recess 113 and near the opening of the second recess 123 (open side in the thickness direction), and having a shallow depth from the opening. The near-side mounting surface 124a is formed to extend longitudinally and widthwise. The second recess 123 also includes a far-side mounting surface 124c located closer to the first recess 113 and on the far side of the second recess 123, and having a deep depth. The far-side mounting surface 124c is formed to extend longitudinally and widthwise. A stepped surface 124b connecting the near-side mounting surface 124a and the far-side mounting surface 124c is formed in the second recess 123 so as to extend in the thickness direction of the second lead frame 12. Thus, the second recess 123 includes a stepped portion 124 formed by the near-side mounting surface 124a, the far-side mounting surface 124c, and the stepped surface 124b.

As described above, in the present embodiment, each lead frame has the two-stepped recess. With this structure, the relatively large thermistor 13 is mounted on the upper stage of the wide recess, and the relatively small thermistor is mounted on the narrow lower stage. In other words, by forming the step in the recess, the mounting location can be appropriately selected in accordance with the size of the thermistor 13.

The first lead frame 11 and the second lead frame 12 are formed such that the depth from the opening of the near-side mounting surface 114a and the depth from the opening of the near-side mounting surface 124a are substantially the same. Further, the first lead frame 11 and the second lead frame 12 are formed such that the depth from the opening of the far-side mounting surface 114c and the depth from the opening of the far-side mounting surface 124c are substantially the same. The first lead frame 11 and the second lead frame 12 have the near-side mounting surface 114a and the near-side mounting surface 124a on the same plane, and the far-side mounting surface 114c and the far-side mounting surface 124c on the same plane.

As described above, in the present embodiment, the first lead frame 11 and the second lead frame 12 have a mirror-symmetrical shape with respect to the plane extending in the longitudinal direction and the thickness direction.

As the thermistor 13 mounted on the pair of lead frames 11 and 12, a negative temperature coefficient (NTC) thermistor, for example, whose resistance decreases with the increase of the temperature can be used. A positive temperature coefficient (PTC) thermistor whose resistance increases with the increase of the temperature can also be used. It is also possible to use a critical temperature resistor (CTR) thermistor whose resistance decreases sharply above a certain temperature.

Further, in the present embodiment, a surface mount type (chip-like thermistor) is used as the thermistor 13.

A conventionally known thermistor can be used as the thermistor 13.

Then, the surface mount type thermistor 13 is mounted on the first lead frame 11 and the second lead frame 12 by soldering. In this way, by mounting the surface mount type thermistor 13 using solder, there is no need to access from the rear side when connecting the thermistor 13 to the lead frame, and the thermistor 13 can be connected to the lead frame more easily.

Further, as described above, in the present embodiment, the thermistor 13 and the portions where the thermistor is mounted on the first and second lead frames 11 and 12 are entirely covered with the resin mold portion 14. The first and second lead frames 11 and 12 are each formed such that the entire portion formed to protrude toward the opponent buried portion is covered with the resin mold portion 14 on one end side in the longitudinal direction, while the other end side in the longitudinal direction is exposed from the resin mold portion 14. In other words, the sensor body 10 is formed in such a manner that only the first terminal portion 112 and the second terminal portion 122, each having a function as a terminal, protrude outward. As described above, the thermistor 13 is protected by covering the thermistor 13 with the resin mold portion 14. The resin mold portion 14 can be formed, for example, by transfer molding of epoxy resin.

The oil temperature sensor 1 is formed using the sensor body 10 manufactured in this manner.

Specifically, the oil temperature sensor 1 is formed by connecting, to the first and second terminal portions 112 and 122 of the sensor body 10, a joint terminal portion, which is connected to the cable for extracting an output signal from the thermistor 13 to an external device.

Figure 2:
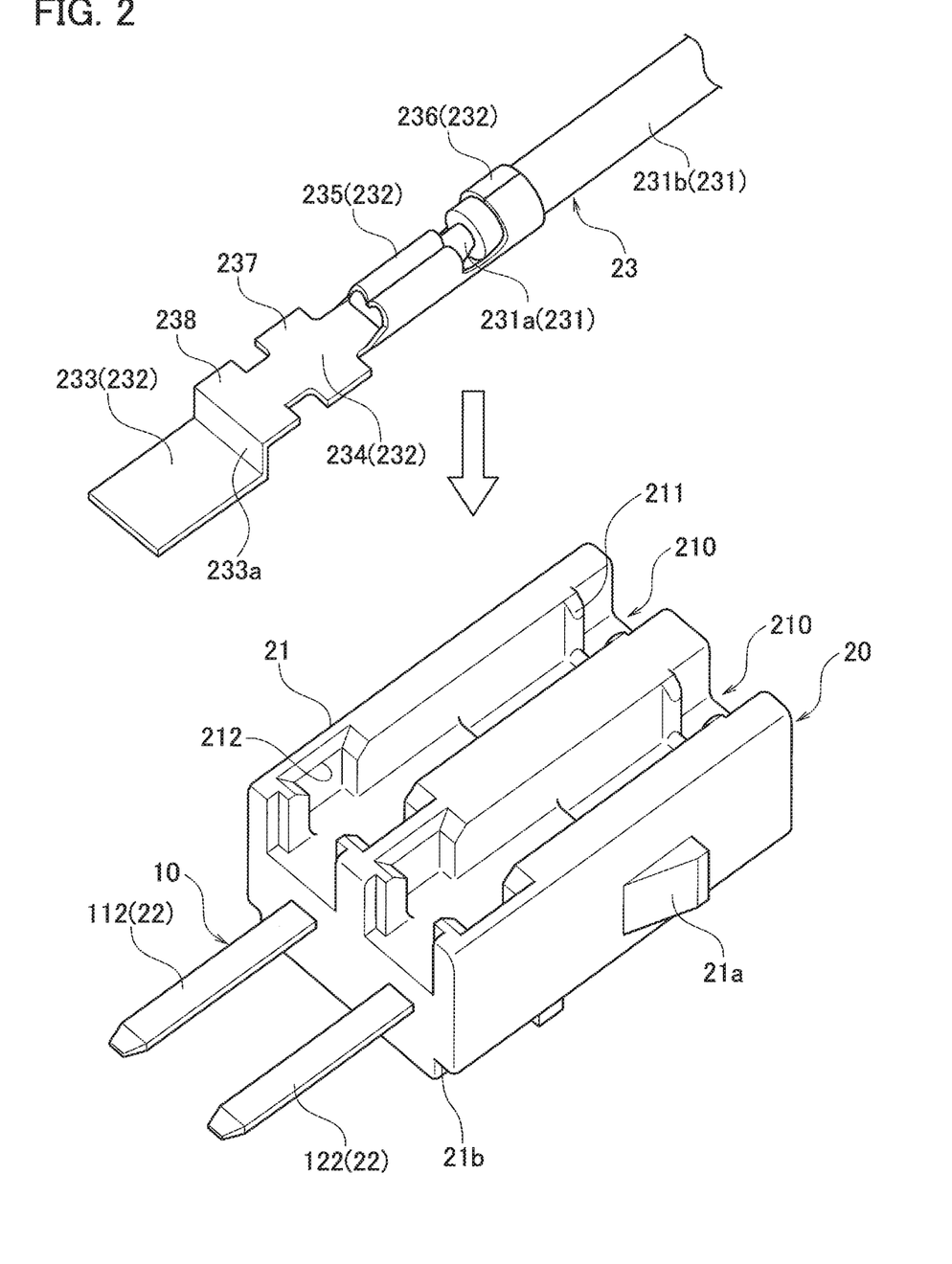
FIG. 2 is a perspective view schematically illustrating a state before a cable-attached terminal is inserted into a housing assembly according to the first embodiment.

The oil temperature sensor 1 includes a housing assembly 20 in which the sensor body 10 is integrated with the housing 21 so that the terminal portions 112 and 122 on the tip side are exposed outward (see FIG. 2).

In other words, the housing assembly 20 is formed by insert-molding of the sensor body 10 in the housing 21.

The resin mold portion 14 of the sensor body 10 is buried in the housing 21. The sensor body 10 is fixed to the housing 21 in such a manner that the tip sides of the first and second terminal portions 112 and 122 are exposed to protrude outward from the housing 21. The portions of the first and second terminal portions 112 and 122 protruding outward from the housing 21 are the terminal portions 22 of the housing assembly 20. The terminal portion 22 is formed in a pair.

In the present embodiment, the housing 21 is formed in a substantially rectangular parallelepiped shape, and is made of a material such as polyphenylene sulfide (PPS), or 6,6 nylon.

A pair of grooves 210 is formed on the surface on one side of the housing 21. A cable-attached terminal 23 is partially inserted into each groove 210. In the present embodiment, the pair of grooves 210 is formed on the surface on one side of the terminal portion 22 in the thickness direction, the terminal portion 22 being formed when the housing assembly 20 is formed. In other words, the pair of grooves 210 is formed on the surface of the housing 21 extending in the protruding direction of the terminal portions 22 and in the direction in which the pair of terminal portions 22, 22 is arranged side by side.

In the present embodiment, the pair of grooves 210 is formed linearly so as to extend substantially in the protruding direction of the terminal portion 22. In other words, the housing 21 includes the pair of grooves 210 arranged so as to extend substantially in parallel with each other.

Further, in the present embodiment, when the surface on one side of the housing 21 is seen in the thickness direction (normal to the surface on one side) of the terminal portion 22, one groove 210 is formed to overlap the buried portion of the terminal portion 112 in the housing 21, while the other groove 210 is formed to overlap the buried portion of the terminal portion 122 in the housing 21. In other words, the pair of grooves 210 is arranged at a portion of the terminal portions 112 and 122 on one side of the portion buried in the housing 21 in the thickness direction, the grooves 210 being arranged separately on the terminal portions 112 and 122.

The pair of grooves 210 is formed as recesses, when seen in the protruding direction of the terminal portions 22, and is also formed to penetrate in the protruding direction of the terminal portions 22. In other words, the pair of grooves 210 is formed in such a manner that each groove 210 is opened at both ends in the extending direction of each groove 210 (in the same direction as the protruding direction of the terminal portions 22) and also opened in the thickness direction of the terminal portions 22 (normal to the surface on one side, i.e., in a direction crossing the extending direction).

With this structure, the cable-attached terminal 23 arranged linearly along the groove 210 can be inserted partially into the groove 210 by simply moving the cable-attached terminal 23 in the thickness direction of the terminal portion 22 (in the direction crossing the extending direction of the cable 231).

Figure 3:
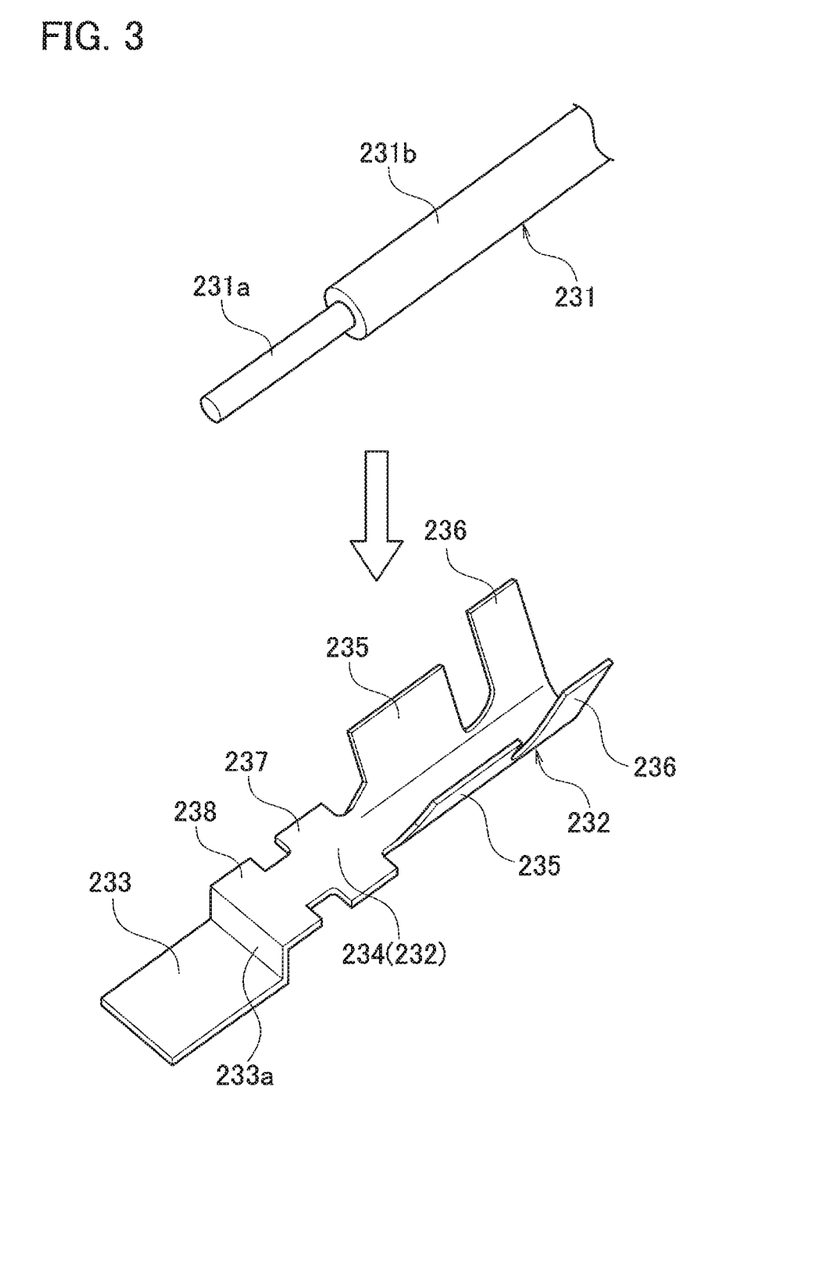
FIG. 3 is a perspective view schematically illustrating a cable and a terminal before the cable-attached terminal is formed according to the first embodiment.

Each cable-attached terminal 23 inserted into the groove 210 includes a substantially cylindrical cable 231 and a joint terminal portion 232 which is electrically connected to a conductor 231a of the cable 231 (see FIG. 3).

The cable 231 includes the conductor 231a and an insulating sheath 231b covering the outer periphery of the conductor 231a. The joint terminal portion 232 is connected to a portion (exposed portion) of the conductor 231a not covered by the sheath 231b. The conductor 231a can be made of, for example, aluminum or an aluminum-based alloy.

The joint terminal portion 232 is made of a conductive metal material such as a copper alloy, and can be formed by bending or pressing a single plate-like member.

The joint terminal portion 232 includes a connecting terminal portion 233, which is exposed outward from the housing 21 and electrically connected to the terminal portion 22, and a portion to be inserted 234 which is provided continuously from the connecting terminal portion 233 and inserted into the groove 210. The joint terminal portion 232 also includes a conductor crimping portion (cable connecting portion) 235 which is provided continuously from the portion to be inserted 234 and crimped and electrically connected to the conductor 231a of the cable 231. Further, the joint terminal portion 232 includes a cable holding portion (cable connecting portion) 236 which is provided continuously from the conductor crimping portion 235 and crimped to the sheath 231b of the cable 231 to hold the cable 231.

The joint terminal portion 232 except for the connecting terminal portion 233 (the portion to be inserted 234 and the cable connecting portions 235 and 236) is inserted into the groove 210. At this time, the sheath 231b located outside the cable holding portion 236 of the cable 231 is also inserted partially into the groove 210. Thus, the entire cable connecting portions 235 and 236 are inserted into the groove 210, so that the connecting portion between the joint terminal portion 232 and the cable 231 is protected by the groove 210.

In the present embodiment, of the terminal portion 22 and the connecting terminal portion 233, the connecting terminal portion 233 which serves as at least one terminal portion is bent at a portion away from the housing 21 toward the terminal portion 22 which serves as the other terminal portion. In other words, each connecting terminal portion 233 includes a bent portion 233a between the base side (the housing 21 side) and the tip end.

Further, the terminal portion 22 and the connecting terminal portion 233 are arranged to be in contact with each other with the cable-attached terminal 23 being inserted into the groove 210.

With the terminal portion 22 and the connecting terminal portion 233 being in contact with each other, the terminal portion 22 and the connecting terminal portion 233 are mechanically connected. Specifically, the terminal portion 22 and the connecting terminal portion 233 are connected mechanically by welding the terminal portion 22 and the connecting terminal portion 233. In the present embodiment, a welding projection 233b projecting toward the terminal portion 22 is formed on the connecting terminal portion 233. By melting the welding projection 233b, the terminal portion 22 and the connecting terminal portion 233 are welded (see FIG. 5). The terminal portion 22 and the connecting terminal portion 233 may be mechanically connected by a method other than welding such as soldering.

With this structure, the cable 231 can be connected to the terminal portion 22 more efficiently. Further, by connecting (welding) the connecting terminal portion 233 and the terminal portion 22 at a position away from the housing 21, the influence of the thermal expansion and contraction of the housing 21 on the connected portion (welded portion) can be prevented.

In the present embodiment, a press-fit rib 211 that protrudes inward in the width direction of the groove 210 is formed at a portion of the groove 210 where the sheath 231b is inserted. When the cable-attached terminal 23 is inserted into the groove 210, the sheath 231b is press-fitted by the press-fit rib 211. With this structure, the cable-attached terminal 23 can be held more reliably in the groove 210.

Further, by press-fitting the sheath 231b into the groove 210, a pulling force applied to the cable 231 in the extending direction is received by the press-fit portion of the sheath 231b and the press-fit rib 211. For this reason, the force applied to the cable 231 can be prevented from being transmitted to the connected portion (welded portion) between the joint terminal portion 232 and the terminal portion 22. In particular, in the present embodiment, the sheath 231b positioned outside the cable holding portion 236 is press-fitted into the groove 210, so that the pulling force applied to the cable 231 in the extending direction is prevented from being transmitted to the cable holding portion 236 or the conductor crimping portion 235.

As described above, by press-fitting the sheath 231b into the groove 210, the connecting state between the joint terminal portion 232 and the terminal portion 22 and the connecting state between the joint terminal portion 232 and the cable 231 can be maintained more preferably.

Further, the groove 210 is formed with a positioning recess 212 recessed in a direction crossing the extending direction of the groove 210. On the other hand, the portion to be inserted 234 includes a positioning projection 237 arranged in the positioning recess 212 with the cable-attached terminal 23 being inserted into the groove 210. With this structure, the positional displacement of the cable-attached terminal 23 inserted into the groove 210 is prevented.

Since the positioning projection 237 is provided at the positioning recess 212, the positioning projection 237 abuts on the housing 21 in the positioning recess 212 when a pulling force is applied to the cable 231 in the extending direction. For this reason, the pulling force applied to the cable 231 in the extending direction is also received by the positioning projection 237.

Further, with the cable-attached terminal 23 being inserted into the groove 210 on the housing 21 side of the connecting terminal portion 233, a position restricting portion 238 abuts on the housing 21 to restrict movement of the cable-attached terminal 23 in the extending direction of the groove 210.

As described above, in the present embodiment, the movement of the cable-attached terminal 23 in the extending direction of the groove 210 is also restricted by the connecting terminal portion 233 protruding outward from the housing 21. For this reason, the positional displacement of the cable-attached terminal 23 can be prevented more reliably.

Figure 4:
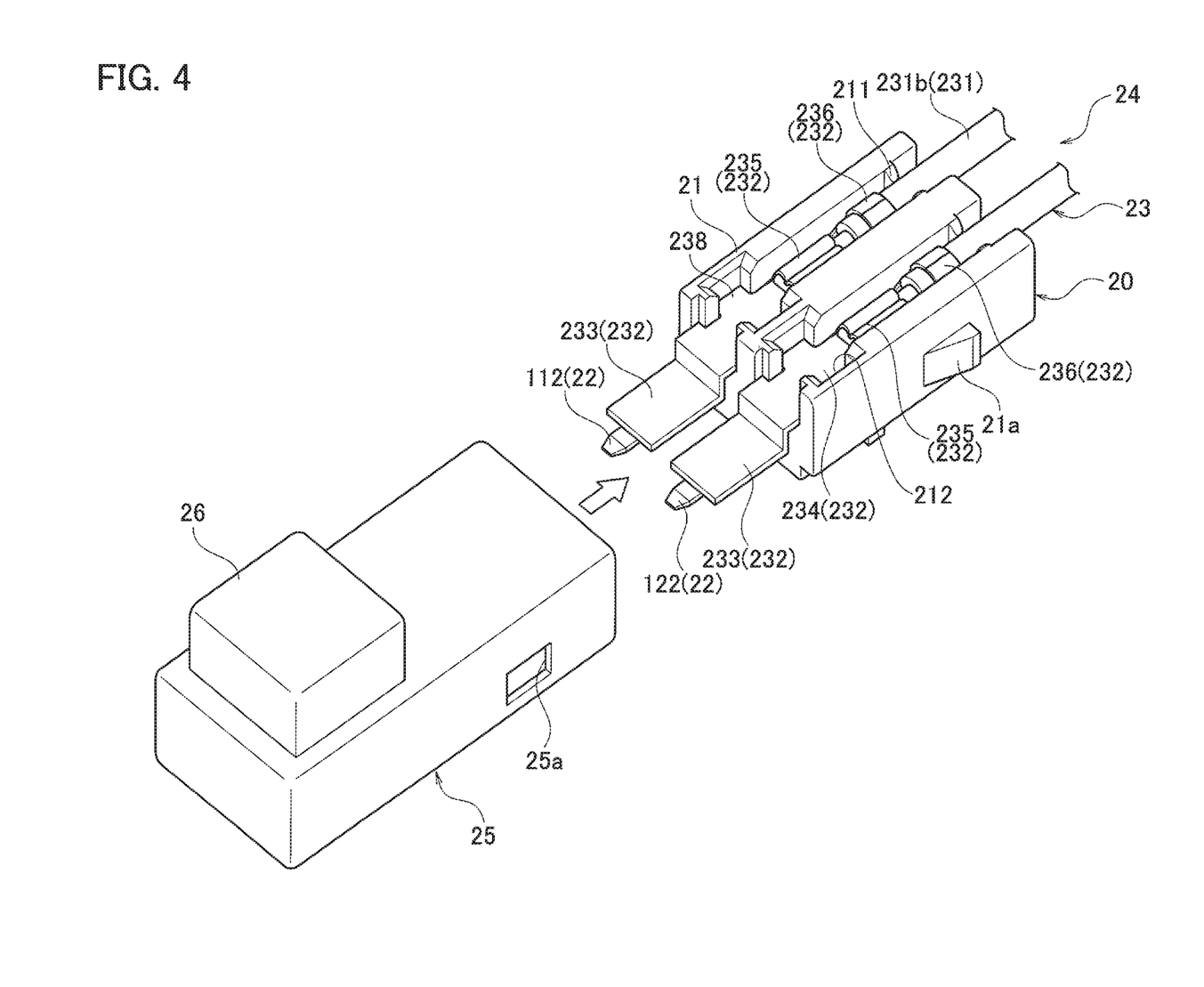
FIG. 4 is a perspective view schematically illustrating a state before a cover is attached to an oil temperature sensor sub-assembly according to the first embodiment.
Figure 5:
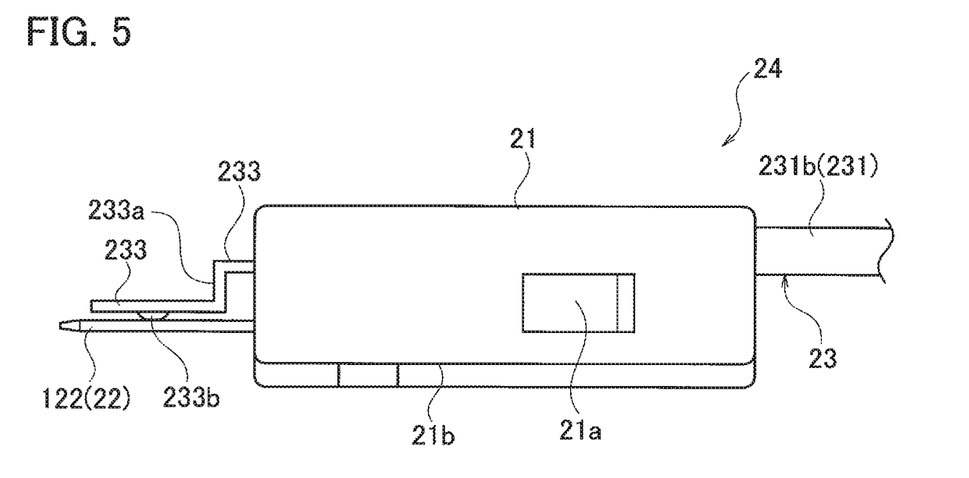
FIG. 5 is a side view schematically illustrating the oil temperature sensor sub-assembly according to the first embodiment.

A sensor sub-assembly 24 is formed by electrically connecting the terminal portion 22 to the connecting terminal portion 233, while the cable-attached terminal 23 is inserted into and holds in the groove 210 (see FIGS. 4 and 5).

Figure 6:
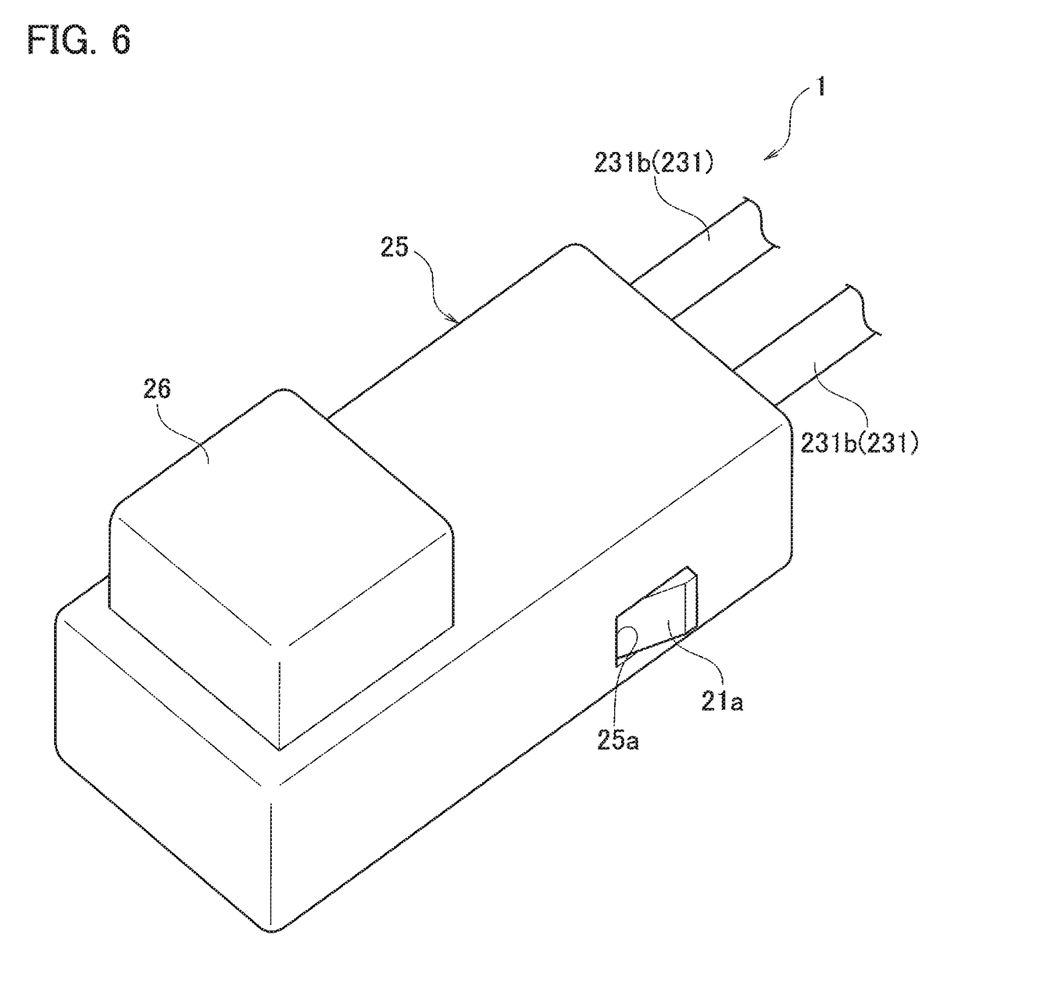
FIG. 6 is a perspective view schematically illustrating the oil temperature sensor according to the first embodiment.

A cover 25 is attached to the sensor sub-assembly 24 to cover the connecting terminal portions 233 and the terminal portions 22 including the connected portions (welded portions) to form the oil temperature sensor 1 (see FIG. 6).

The cover 25 is detachably attached to the housing 21. In the present embodiment, the cover 25 is detachably attached to the housing 21 by detachably engaging an engagement projection 21a formed on the housing 21 with an engagement hole 25a formed on the cover 25.

In the present embodiment, the cover 25 is attached to and detached from the housing 21 by sliding the cover 25 relative to the housing 21. The housing 21 includes guide grooves 21b for guiding guide projections (not illustrated) formed on the cover 25.

The cover 25 includes an attaching portion 26. By attaching the attaching portion 26 to a member to be attached, such as a valve body, the oil temperature sensor 1 is detachably attached to the member to be attached.

As described above, the oil temperature sensor 1 according to the present embodiment includes the housing assembly 20. In the housing assembly 20, the lead frames and 12 on which the thermistor 13 for detecting the temperature of oil is mounted are integrated with the housing 21 in such a manner that the terminal portions 112 and 122 on the tip side are exposed outward.

The housing 21 includes the grooves 210 formed linearly into which the cable-attached terminals 23 are inserted. Each cable-attached terminals 23 includes the cable 231 and the joint terminal portion 232. The joint terminal portion 232 is electrically connected to the conductor 231a exposed from the sheath 231b of the cable 231, and is also electrically connected to the terminal portions 112 and 122.

The grooves 210 are formed in such a manner that each groove 210 is opened at both ends in the extending direction of the groove 210 and is also opened in the direction crossing the extending direction. The joint terminal portion 232 and the sheath 231b of the cable 231 are partially inserted into the groove 210.

The joint terminal portion 232 is connected to the cable 231. The joint terminal portion 232 includes a cable connecting portions 235 and 236 inserted into the groove 210, and the portion to be inserted 234 provided continuously from the cable connecting portions 235 and 236 and inserted into the groove 210. The joint terminal portion 232 includes the connecting terminal portion 233 provided continuously from the portion to be inserted 234, exposed outward from the housing 21, and electrically connected to the terminal portions 112 and 122.

With this structure, the cable 231 can be inserted into the groove 210 more easily. Since the cable 231 and the terminal portions 112 and 122 are connected via the joint terminal portion 232, the cable 231 and the terminal portions 112 and 122 can be connected more efficiently.

As described above, according to the present embodiment, the oil temperature sensor 1 capable of more efficiently holding the cable 231 in the housing 21 and connecting the cable 231 to the terminal portions 112 and 122 is provided.

Further, at a portion of the groove 210 where the sheath 231b is inserted, the press-fit rib 211 protruding inward in the groove 210 is formed.

With this structure, the cable-attached terminal 23 can be held in the groove 210 more reliably. Since the pulling force applied to the cable 231 in the extending direction can be received by the press-fit portion of the sheath 231b and the press-fit rib 211, the force applied to the cable 231 can be prevented from being transmitted to the connecting portions between the joint terminal portion 232 and the terminal portions 112 and 122. As a result, the connection between the joint terminal portion 232 and the terminal portions 112 and 122 can be maintained more preferably.

Further, the groove 210 is provided with the positioning recess 212 recessed in the direction crossing the extending direction of the groove 210. The portion to be inserted 234 includes the positioning projection 237 arranged in the positioning recess 212 with the cable-attached terminal 23 being inserted into the groove 210.

With this structure, it is possible to prevent the positional displacement of the cable-attached terminal 23 inserted into the groove 210, and the force caused by the positional displacement of the cable-attached terminal 23 is prevented from being transmitted to the connecting portion between the joint terminal portion 232 and the terminal portions 112 and 122.

Further, with the cable-attached terminal 23 being inserted into the groove 210, on the housing 21 side of the connecting terminal portion 233, the position restricting portion 238 abuts on the housing 21 to restrict movement of the cable-attached terminal 23 in the extending direction of the groove 210.

With this structure, the movement of the cable-attached terminal 23 in the extending direction of the groove 210 is also restricted by the connecting terminal portion 233 protruding outward from the housing, thereby the positional displacement of the cable-attached terminal 23 can be prevented more reliably.

The terminal portions 112 and 122 are arranged to be in contact with the connecting terminal portions 233 and 233, respectively, with the cable-attached terminals 23 and being inserted into the grooves 210, so that the terminal portions 112 and 122 and the connecting terminal portions 233 and 233 are mechanically connected.

With this structure, the cable 231 can be connected to the terminal portions 112 and 122 more efficiently.

At least one terminal portion of the terminal portions 112 and 122 and the connecting terminal portion 233 is bent at a portion away from the housing 21 toward the other terminal portion.

With this structure, the cables 231 and 231 are connected to the terminal portions 112 and 122, respectively, at positions away from the housing 21, thus preventing the connecting portions from being affected by thermal expansion and contraction of the housing 21.

Second Embodiment

In the present embodiment, the shape of the housing assembly 20 is different from that of the first embodiment, but the other portions of the structure are the same as those illustrated in the first embodiment. The oil temperature sensor 1 according to the present embodiment is formed with members made of the same material as those in the first embodiment.

Therefore, the present embodiment also uses the sensor body 10 illustrated in the first embodiment. Then, the housing assembly 20 is formed by integrating the sensor body 10 with the housing 21 so that the tip-side terminal portions 112 and 122 of the sensor body 10 are exposed outward (see FIG. 10).

Figure 10:
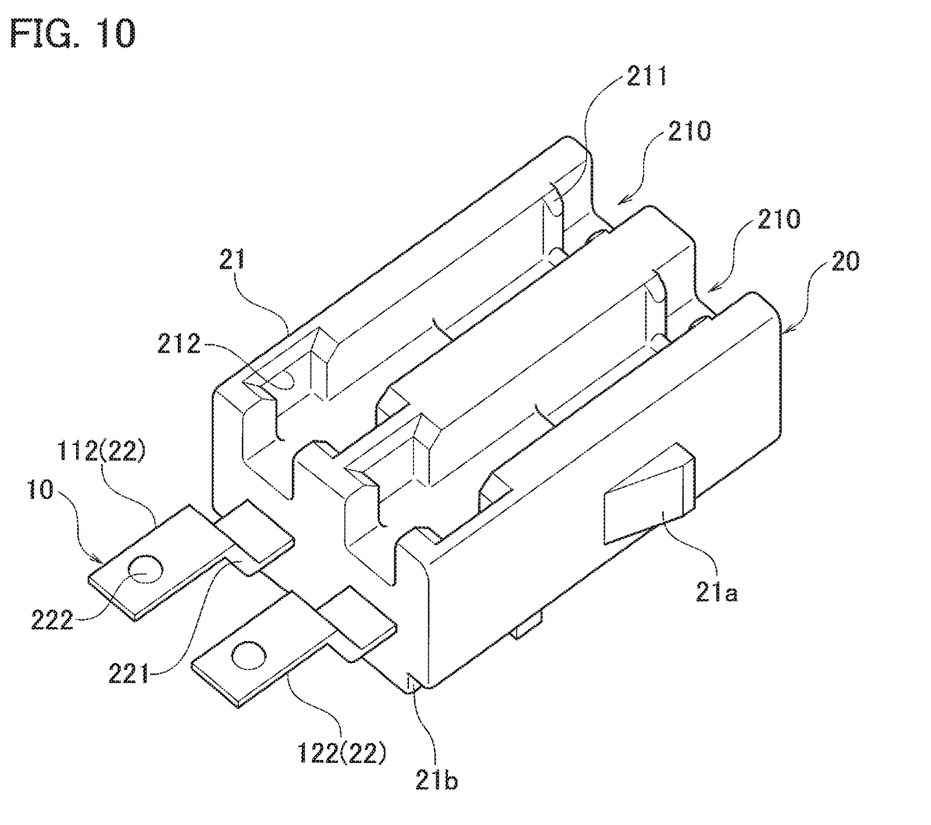
FIG. 10 is a perspective view schematically illustrating a housing assembly according to the second embodiment.

In other words, the housing assembly 20 is formed by insert-molding of the sensor body 10 in the housing 21. Similar to the first embodiment, the resin mold portion 14 of the sensor body 10 is buried in the housing 21. Further, the sensor body 10 is fixed to the housing 21 in such a manner that the tip sides of the first and second terminal portions 112 and 122 are exposed to protrude outward from the housing 21. The portions of the first and second terminal portions 112 and 122 protruding outward from the housing 21 are the terminal portions 22 of the housing assembly 20. Thus, the terminal portion 22 is formed in a pair.

In the present embodiment, of the terminal portion 22 and the connecting terminal portion 233, the terminal portion 22 which serves as at least one terminal portion is bent at a portion away from the housing 21 toward the terminal portion 233 which serves as the other terminal portion. In other words, each terminal portion 22 includes a bent portion 221 between the base side (the housing 21 side) and the tip end.

The pair of grooves 210 is also formed on the surface on one side of the housing 21 in the present embodiment. A cable-attached terminal 23 is partially inserted into each groove 210. The shape of the grooves 210 is similar to the shape of the grooves 210 illustrated in the first embodiment.

In other words, each groove 210 includes the press-fit rib 211 for press-fitting the sheath 231b and the positioning recess 212 in which the positioning projection 237 of the cable-attached terminal 23 is arranged with the cable-attached terminal 23 being inserted into the groove 210.

Figure 7:
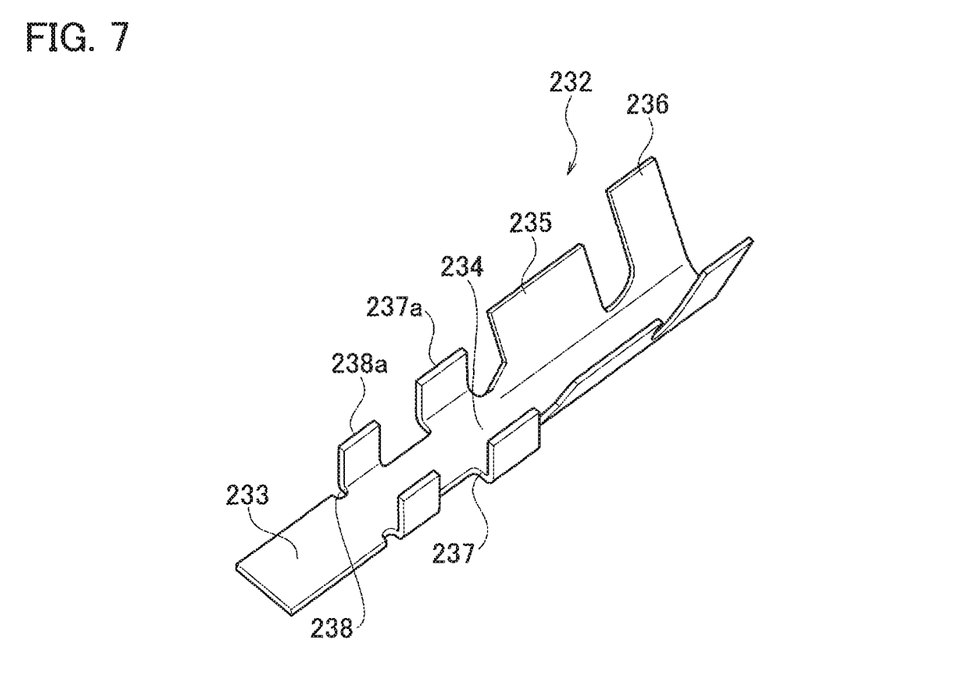
FIG. 7 is a perspective view schematically illustrating a terminal before the cable-attached terminal is formed according to a second embodiment.
Figure 8:
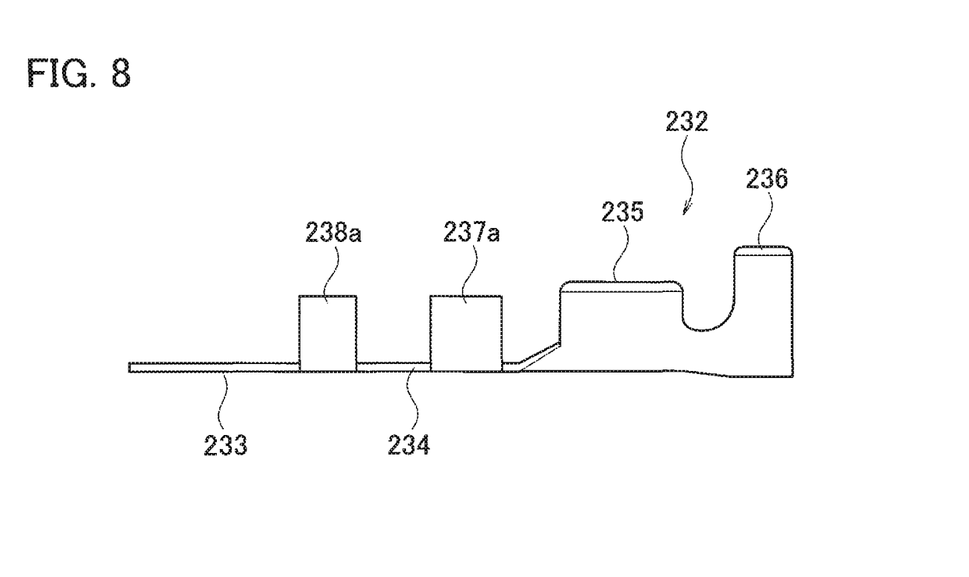
FIG. 8 is a side view schematically illustrating the terminal before the cable-attached terminal is formed according to the second embodiment.
Figure 9:
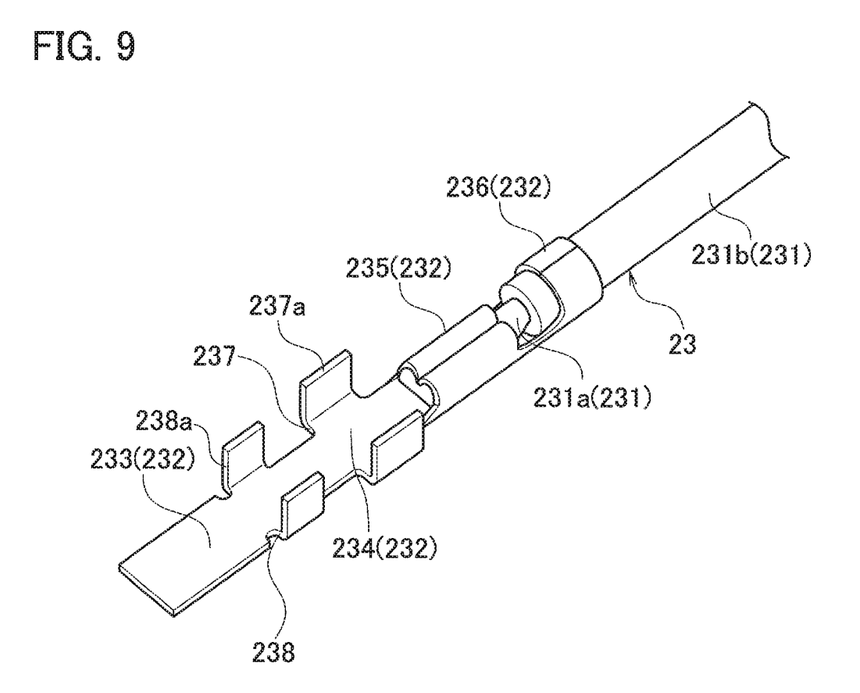
FIG. 9 is a perspective view schematically illustrating the cable-attached terminal according to the second embodiment.

Further, the cable-attached terminal 23 inserted into the groove 210 includes the substantially cylindrical cable 231 and the joint terminal portion 232 electrically connected to the conductor 231a of the cable 231 (see FIGS. 7 to 9). The cable 231 similar to the cable 231 illustrated in the first embodiment is used.

The joint terminal portion 232 includes the connecting terminal portion 233 exposed outward from the housing 21 and electrically connected to the terminal portion 22, so that the connecting terminal portion 233 extends substantially horizontally. In other words, the connecting terminal portion 233 does not include the bent portion 233a, unlike the connecting terminal portion 233 illustrated in the first embodiment. Instead, in the present embodiment, the bent portion 221 is formed in the terminal portion 22.

With this structure, the terminal portion 22 and the connecting terminal portion 233 can be brought into contact with each other with the cable-attached terminal 23 being inserted into the groove 210. The bent portion may be provided on both the terminal portion 22 and the connecting terminal portion 233.

With the terminal portion 22 and the connecting terminal portion 233 being in contact with each other, the terminal portion 22 and the connecting terminal portion 233 are mechanically connected. Specifically, the terminal portion 22 and the connecting terminal portion 233 are connected mechanically by welding the terminal portion 22 and the connecting terminal portion 233. In the present embodiment, a welding projection 222 protruding toward the connecting terminal portion 233 is formed on the terminal portion 22. The terminal portion 22 and the connecting terminal portion 233 are welded by melting the welding projection 222.

The joint terminal portion 232 includes the portion to be inserted 234 inserted into the groove 210, a conductor crimping portion (cable connecting portion) 235 to be crimped to the conductor 231a of the cable 231, and a cable holding portion (cable connecting portion) 236 for holding the cable 231.

A positioning projection 237 is formed on the portion to be inserted 234. A position restricting portion 238 is formed on the housing 21 side of the connecting terminal portion 233.

As described above, the present embodiment also restricts the movement of the cable-attached terminal 23 in the extending direction of the groove 210 by the positioning projection 237 and the position restricting portion 238.

In the present embodiment, the positioning projection 237 is provided with a rising piece 237a rising up toward the opening in one direction. With this structure, the area of the joint terminal portion 232 contacting the housing 21 increases when the positional displacement of the cable-attached terminal 23 is restricted.

Further, the position restricting portion 238 is provided with the rising piece 238a rising up toward the opening side in one direction. With this structure, it is possible to lift the cable-attached terminal 32 by gripping the rising piece 238a mechanically, for example. Gripping the rising piece 238a is easier than gripping a portion extending horizontally.

Figure 11:
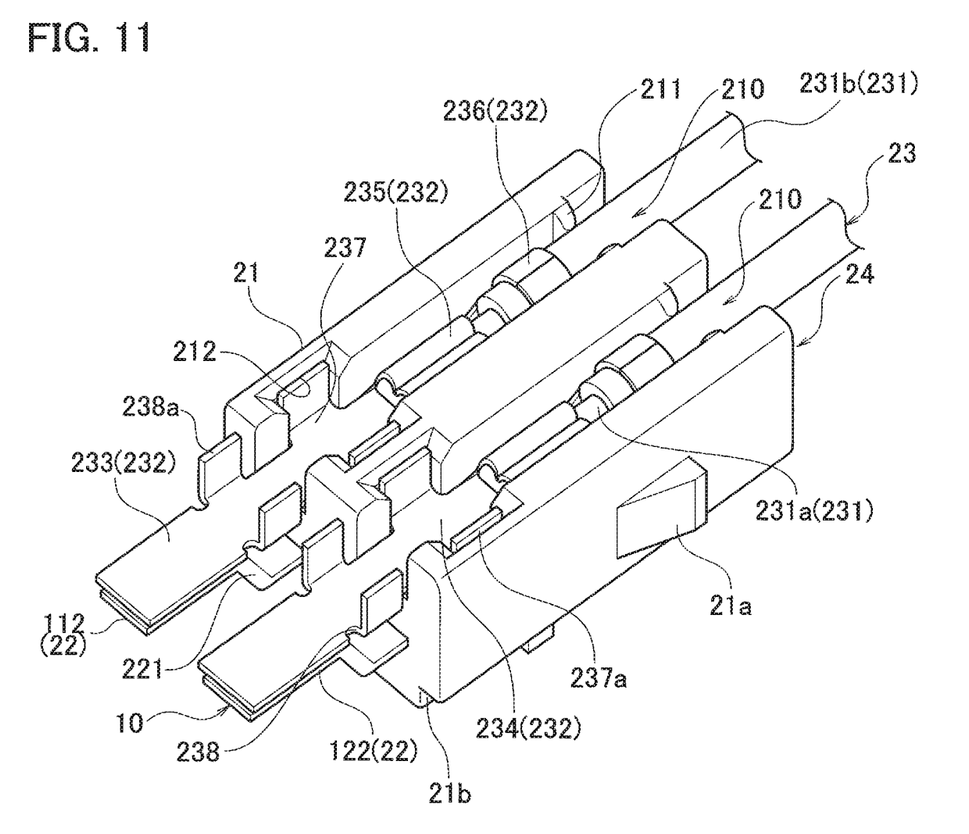
FIG. 11 is a perspective view schematically illustrating an oil temperature sensor sub-assembly according to the second embodiment.
Figure 12:
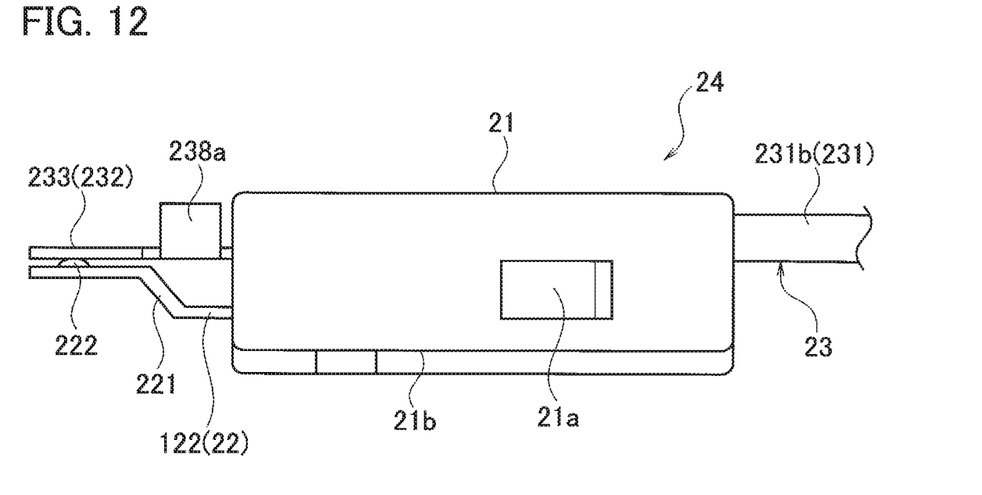
FIG. 12 is a side view schematically illustrating the oil temperature sensor sub-assembly according to the second embodiment.

The sensor sub-assembly 24 is formed by electrically connecting the terminal portions 22 to the connecting terminal portions 233, while inserting and holding the cable-attached terminals 23 in the grooves 210 (see FIGS. 11 and 12).

Further, the oil temperature sensor 1 is formed by attaching a cover (not illustrated) to the sensor sub-assembly 24. The shape of the cover is also the same as the shape of the cover 25 illustrated in the first embodiment.

The present embodiment can also provide the effect similar to the effect of the first embodiment.

In the present embodiment, the positioning projection 237 is provided with the rising piece 237a rising up toward the opening in one direction.

With this structure, when the positional displacement of the cable-attached terminal 23 is restricted, the area of the joint terminal portion 232 contacting the housing 21 increases, and the positional displacement of the cable-attached terminal 23 is more reliably prevented.

In the present embodiment, the position restricting portion 238 is provided with a rising piece 238a rising up toward the opening in one direction.

With this structure, when the cable-attached terminal 32 is lifted, for example, mechanically, it is possible to grip the rising piece 238a which can be gripped relatively easily.

Figure 13A:
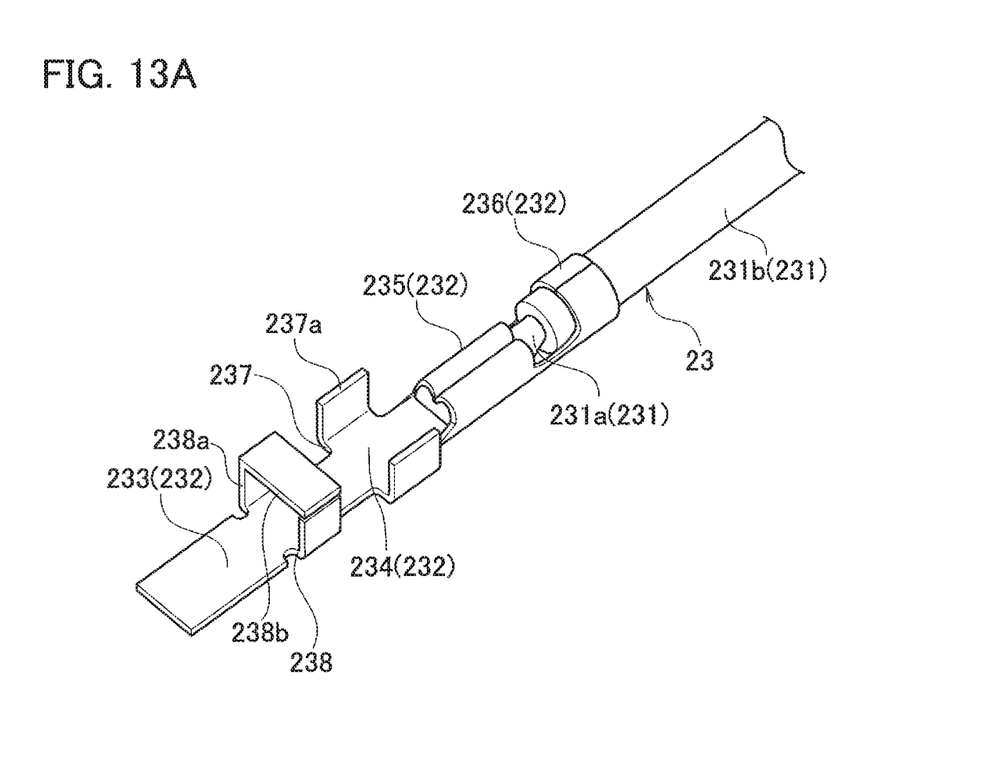
FIG. 13A is a perspective view schematically illustrating a cable-attached terminal according to a modification of the second embodiment in which the cable-attached terminal is illustrated.
Figure 13B:
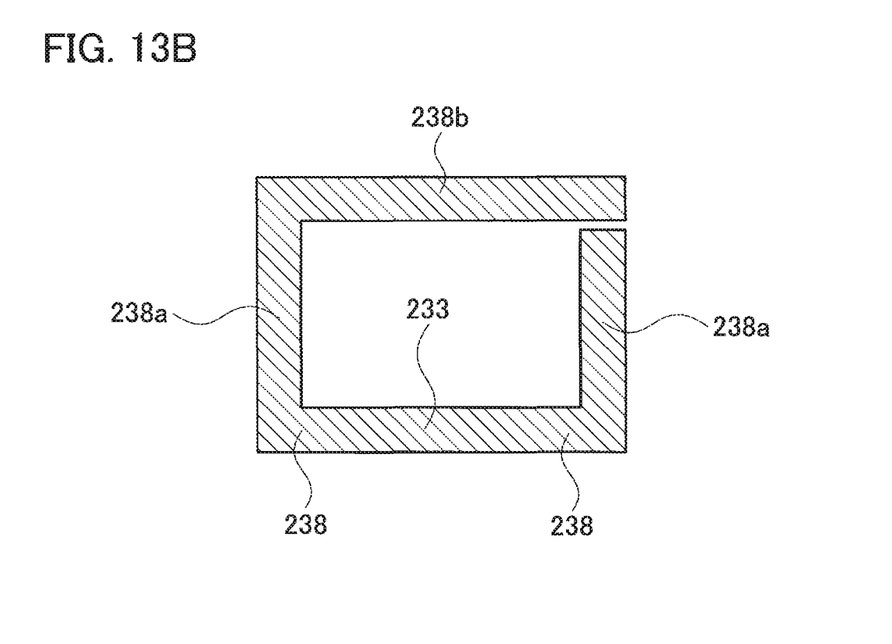
FIG. 13B is cross-sectional view schematically illustrating the cable-attached terminal according to the modification of the second embodiment in which a position restricting portion formed on the cable-attached terminal is illustrated.

As illustrated in FIGS. 13A and 13B, the one rising piece 238a may be provided with a horizontal piece 238b extending toward the tip end of the other rising piece 238a. With this structure, the cable-attached terminal 23 can be lifted by inserting a holding member such as a pin into the through hole of the position restricting portion 238 enclosed in a substantially rectangular cylindrical shape.

Although preferred embodiments of the invention have been described, the present invention is not limited to the above embodiments, and various modifications are possible.

For example, the housing assembly 20 is formed by forming the sensor body 10 and integrating the sensor body 10 with the housing 21 in each embodiment. Alternatively, the sensor body (a member obtained by simply mounting the thermistor 13 on the lead frame) in which the thermistor 13 is not covered by the resin mold portion 14 may be directly integrated with the housing 21.

What is claimed is:

1. An oil temperature sensor, comprising:
   a housing assembly in which a lead frame on which a thermistor for detecting a temperature of oil is mounted is integrated with a housing in a manner that a tip-side terminal portion is exposed outward, wherein
   the housing includes a groove formed linearly and into which a cable-attached terminal is inserted, the cable-attached terminal including a cable and a joint terminal portion, the joint terminal portion being connected electrically to a conductor exposed from a sheath of the cable and being connected electrically to the terminal portion,
   the groove is formed to be opened on both sides in an extending direction of the groove and opened in one direction crossing the extending direction,
   the joint terminal portion and the sheath of the cable are partially inserted into the groove,
   the joint terminal portion includes a cable connecting portion, a portion to be inserted, and a connecting terminal portion, the cable connecting portion being connected to the cable and inserted into the groove, the portion to be inserted being provided continuously from the cable connecting portion and inserted into the groove, and the connecting terminal portion being provided continuously from the portion to be inserted, exposed outward from the housing, and connected electrically to the terminal portion,
   with the cable-attached terminal being inserted into the groove, the terminal portion and the connecting terminal portion are in contact with each other, and
   the terminal portion and the connecting terminal portion are mechanically connected.

2. The oil temperature sensor according to claim 1, wherein the groove includes a press-fit rib formed protruding inside the groove at a portion of the groove into which the sheath is inserted.

3. The oil temperature sensor according to claim 1, wherein
   the groove includes a positioning recess recessed in a direction crossing the extending direction of the groove, and
   the portion to be inserted includes a positioning projection arranged in the positioning recess with the cable-attached terminal being inserted into the groove.

4. The oil temperature sensor according to claim 3, wherein the positioning projection is provided with a rising piece rising up toward the opening in the one direction.

5. The oil temperature sensor according to claim 1, wherein the connecting terminal portion includes, on the housing side, a position restricting portion that abuts on the housing to restrict movement of the cable-attached terminal in the extending direction of the groove with the cable-attached terminal being inserted into the groove.

6. The oil temperature sensor according to claim 5, wherein the position restricting portion is provided with a rising piece rising up toward the opening in the one direction.

7. The oil temperature sensor according to claim 1, wherein, at least one terminal portion of the terminal portion and the connecting terminal portion is bent at a portion away from the housing toward the other terminal portion.

* * * * *